(12) United States Patent
Squier et al.

(10) Patent No.: US 7,188,181 B1
(45) Date of Patent: Mar. 6, 2007

(54) UNIVERSAL SESSION SHARING

(75) Inventors: Anthony C. Squier, Oakland, CA (US); Calvin J. Austin, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/345,226

(22) Filed: Jun. 30, 1999

(51) Int. Cl.
G06F 15/16 (2006.01)

(52) U.S. Cl. .......................... 709/228; 713/171; 726/8

(58) Field of Classification Search ............ 709/229, 709/225, 218, 203, 219, 227–228, 248, 205, 709/226; 713/201, 200, 171, 170, 150, 185; 380/277, 227; 705/71; 726/8, 9
See application file for complete search history.

(56) References Cited

U.S. PATENT DOCUMENTS

| | | | |
|---|---|---|---|
| 5,655,077 A * | 8/1997 | Jones et al. ................. 713/201 |
| 5,684,950 A * | 11/1997 | Dare et al. .................. 713/201 |
| 5,708,780 A * | 1/1998 | Levergood et al. ......... 709/225 |
| 5,757,920 A * | 5/1998 | Misra et al. ................ 713/158 |
| 5,784,463 A * | 7/1998 | Chen et al. ................. 713/171 |
| 5,835,724 A * | 11/1998 | Smith ......................... 709/227 |
| 5,870,473 A * | 2/1999 | Boesch et al. ................ 705/78 |
| 5,875,296 A | 2/1999 | Shi et al. ............... 395/188.01 |
| 5,895,296 A * | 4/1999 | Okabe ........................ 713/200 |
| 5,898,780 A * | 4/1999 | Liu ............................... 7/155 |
| 5,944,824 A * | 8/1999 | He ............................. 713/201 |
| 5,999,711 A * | 12/1999 | Misra et al. ................. 709/310 |
| 5,999,971 A * | 12/1999 | Buckland ................... 709/218 |
| 6,041,357 A * | 3/2000 | Kunzelman et al. ........ 709/228 |
| 6,049,820 A * | 4/2000 | Murphy, Jr. et al. ........ 709/203 |
| 6,058,424 A * | 5/2000 | Dixon et al. ................ 709/226 |
| 6,098,093 A * | 8/2000 | Bayeh et al. ............... 709/203 |
| 6,138,120 A * | 10/2000 | Gongwer et al. ............. 707/10 |
| 6,141,758 A * | 10/2000 | Benantar et al. ............ 713/201 |
| 6,178,244 B1 * | 1/2001 | Takeda et al. .............. 380/277 |
| 6,182,142 B1 * | 1/2001 | Win et al. ................... 709/219 |

(Continued)

FOREIGN PATENT DOCUMENTS

EP 0 573 248 A1 12/1993

(Continued)

*Primary Examiner*—Abdullahi Salad
(74) *Attorney, Agent, or Firm*—Dorsey & Whitney LLP

(57) ABSTRACT

Methods, systems, and computer program products are disclosed for sharing data related to a session created by a user within a domain of sites or services. A user logs on to a site, such as a Web site or other entity, and creates a session. The session created has an identifier which can be shared with other sites or entities in the same domain or logical group. In the course of utilizing services on the site, the user attempts access to services on another site. When this attempt is made, the user's session data is passed to the second site. The session data is analyzed on the second site by checking configuration data on the second site. If it is not found to be valid (e.g. it is created by a site outside the domain of the second site), the user is required to explicilty logon. If the configuration data indicates that it is valid, the session data is passed back to the first site using a verification routine (part of the configuration data) on the second site. If the first site authenticates the session data, the user is allowed to access services on the second site without having to explicitly logon.

14 Claims, 7 Drawing Sheets

U.S. PATENT DOCUMENTS

| | | | |
|---|---|---|---|
| 6,226,752 B1 * | 5/2001 | Gupta et al. | 713/201 |
| 6,243,816 B1 * | 6/2001 | Fang et al. | 707/9 |
| 6,253,327 B1 * | 6/2001 | Zhang et al. | 713/201 |
| 6,275,944 B1 * | 8/2001 | Kao et al. | 709/229 |
| 6,374,300 B2 * | 4/2002 | Masters | 709/105 |
| 6,374,359 B1 * | 4/2002 | Shrader et al. | 713/201 |
| 6,480,894 B1 * | 11/2002 | Courts et al. | 709/227 |
| 6,490,624 B1 * | 12/2002 | Sampson et al. | 709/227 |
| 6,535,880 B1 * | 3/2003 | Musgrove et al. | 707/10 |
| 6,539,494 B1 * | 3/2003 | Abramson et al. | 714/4 |
| 6,587,880 B1 * | 7/2003 | Saigo et al. | 709/225 |
| 6,629,144 B1 * | 9/2003 | Chu et al. | 709/227 |
| 6,662,213 B1 * | 12/2003 | Xie et al. | 709/206 |
| 6,742,126 B1 * | 5/2004 | Mann et al. | 713/201 |

FOREIGN PATENT DOCUMENTS

| | | |
|---|---|---|
| EP | 0 651 533 A2 | 5/1995 |

\* cited by examiner

UNIVERSAL SESSION SHARING

BACKGROUND OF THE INVENTION

1. Field of the Invention

The present invention relates generally to computer networks and software. More specifically, it relates to software-implemented methods of sharing session data, typically related to a user, over multiple sites or servers using a message protocol and data format.

2. Discussion of Related Art

As the number of Web sites grows and as more individuals use the Internet to get information, access services, make purchases, etc., the frequency of having to access or log onto related Web sites to access services increases. For example, while making a purchase from a Web site of a large online vendor, the purchaser may want to link to another related, specialized vendor site as suggested in the original site. From one perspective, the need for users having to access other sites can be narrowed, in a sense, to multiple servers (supporting, for example, HTTP/1.0 protocol) within a single enterprise or private entity. For example, a software engineer wanting access to three different developer sites on the company's intranet must log onto each site separately every time the engineer visits a different site. Yet, from another perspective, the need to access various "sites" can be expanded to include smart devices. For example, such devices can be items in a hotel room such as the lock to the door, the telephone, cable box, computer, etc. Presently, a guest arriving in a room equipped with such devices must somehow identify himself to each of the devices in order to activate or use them, such as speaking with a hotel operator to make a long distance call or making another call to watch a movie over cable.

Regardless of what type of site is at issue, the need to repeatedly log on or somehow identify oneself to multiple sites can become cumbersome and inefficient. This is seen as particularly frustrating and unnecessary to users in contexts where the sites are in one domain or system and should be capable sharing user session data. The term "domain" is not limited to an Internet domain, such as eng.sun.com or sun.com, but can include other types of physically or logically grouped entities or devices capable of communicating data via a recognizable protocol. Returning to the previous point, the software engineer likely has a user profile in an enterprise-wide user database that should be accessible by all three developmental sites. Thus, by logging onto one site, the other two sites should know who the user is through some type of "behind the scenes" process. Similarly, once a hotel guest unlocks the door, a user identifier is transmitted downloaded to door lock device, for example through a Java™ ring worn by the guest, should be accessible by the telephone or other devices in the room unlocked by the guest.

Presently, models and systems exist that allow a user to logon to a site or server once and not have to repeat the logon process for other sites in the same domain or system. However, this domain or system is defined in one respect by the fact that sites in the domain share a central repository of information which stores profiles of each user and other data needed so that the user should not have to logon to each site. However, having a single repository of data, whether on one server or distributed, creates a single point of failure for the entire domain. If the repository experiences a shutdown or is disrupted in some manner, all users logged on to all sites in the domain will very likely be affected. Having such a single point that can lead to system-wide disruption should be avoided if possible. As systems, networks, including the Internet, and other models (e.g., the hotel room) are developed, it will be increasingly important to prevent disruptions in service for all users or sites if an isolated problem arises.

Therefore, it would be desirable to enable a user having logged onto one site, such as a Web site or a smart device, thereby creating a session to access other sites in the same domain without having to repeatedly log onto the other sites. Such a process should take into consideration authentication and security issues among the sites. It would also be desirable to have a flexible, distributed process in which there is no central repository thereby avoiding a single point of failure. In other words, it would be desirable for a system to have distributed failure points achieved through session management distributed among the sites.

SUMMARY OF THE INVENTION

According to the present invention, methods, apparatus, and computer program products are disclosed for universal session sharing in a domain of sites. In one aspect of the present invention a method of sharing data related to a session created by a user within a predefined group of services is described. A session identifier associated with a user is created when the user logs on to a service, for example on a Web site on a server. The session identifier is passed to a second service when the user attempts to access services on the service, typically while in the course of or after using the first service. The session identifier is validated by the second service and the original service that the user logged onto at the time the user initially accesses second service. A second session identifier associated with the user is created once the first session identifier is validated and authenticated by the two services. Once the second session identifier is created, the user can utilize the second service without requiring the user to log on to the second service.

In one embodiment the services are Web sites and the first session identifier is embedded in a cookie when passed from the first service to the second service. In another embodiment the first session is validated by checking on the second service whether the session is from a valid service. In another embodiment the first session identifier is examined on the first service. In another embodiment the first session identifier is validated by examining session sharing rules associated with the second service, determining whether the second service can communicate session data with the first service, and examining a verification routine associated with the first service.

In another aspect of the present invention, a method of authenticating sessions so that they can be shared among sites within a domain of allowable sites is described. A first identifier is assigned to a session when a user logs onto a first site, referred to as an origin site. The identifier is transmitted to a second or destination site when the user attempts to access services on that site. The destination site determines whether the identifier was created by a site from the domain of allowable sites. A second identifier corresponding to a second session on the destination is created if it is determined that the first identifier was created by the origin site.

In one embodiment of the invention the first identifier is transmitted to a destination site through the use of a cookie. In another embodiment determining whether the first identifier is created by the origin site is performed on the destination site and determining whether the first identifier was in fact created by the origin site is performed on the origin site. In another embodiment a list of sites with which the destination server can share a session is examined on the destination site. In yet another embodiment a second identifier is created after session data related to the origin site is examined. In another embodiment the first identifier is examined on the destination site and the source of the first identifier is determined by extracting data associated with the origin site. It is then determined whether the source of the first identifier is one with which the destination site can share a session. This is done by examining a list of sites maintained by the destination site. If the source is a site with which the destination site can share session data, the first identifier is authenticated on the origin site.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In accordance with one embodiment of the present invention, there is provided processes of sharing session data typically associated with a user among multiple sites in a domain while maintaining authentication and security features as described in the various figures. A user explicitly logs on to one site, such as a Web site or a smart device, thereby creating a session with that site. While utilizing services on the site, the user may want to access services from another site in the same "domain" or group of sites. It should be noted here that although the term "domain" has a certain meaning in Internet programming, its use in the discussion below is broader. It includes a group of sites, entities, servers, or devices that are logically or physically connected such that they can communicate data using a recognizable protocol or communication medium. Thus, a domain can include sites, devices, or other entities that are outside a given pre-configured or pre-defined set or group, as long as the entities can communicate and have the same session sharing features described below. User and other data associated with that session can be shared with the second site if certain conditions are met. By allowing the first site to share the session data with the second site, the user does not need to logon to the second site. The session data is passed to and validated on the second site once the user attempts to access services on the second site. If the validation is successful, an authentication process takes place on the original site. Thus, only if the session data is successfully examined on both sites can the user bypass logging on to the second site.

Figure 1:
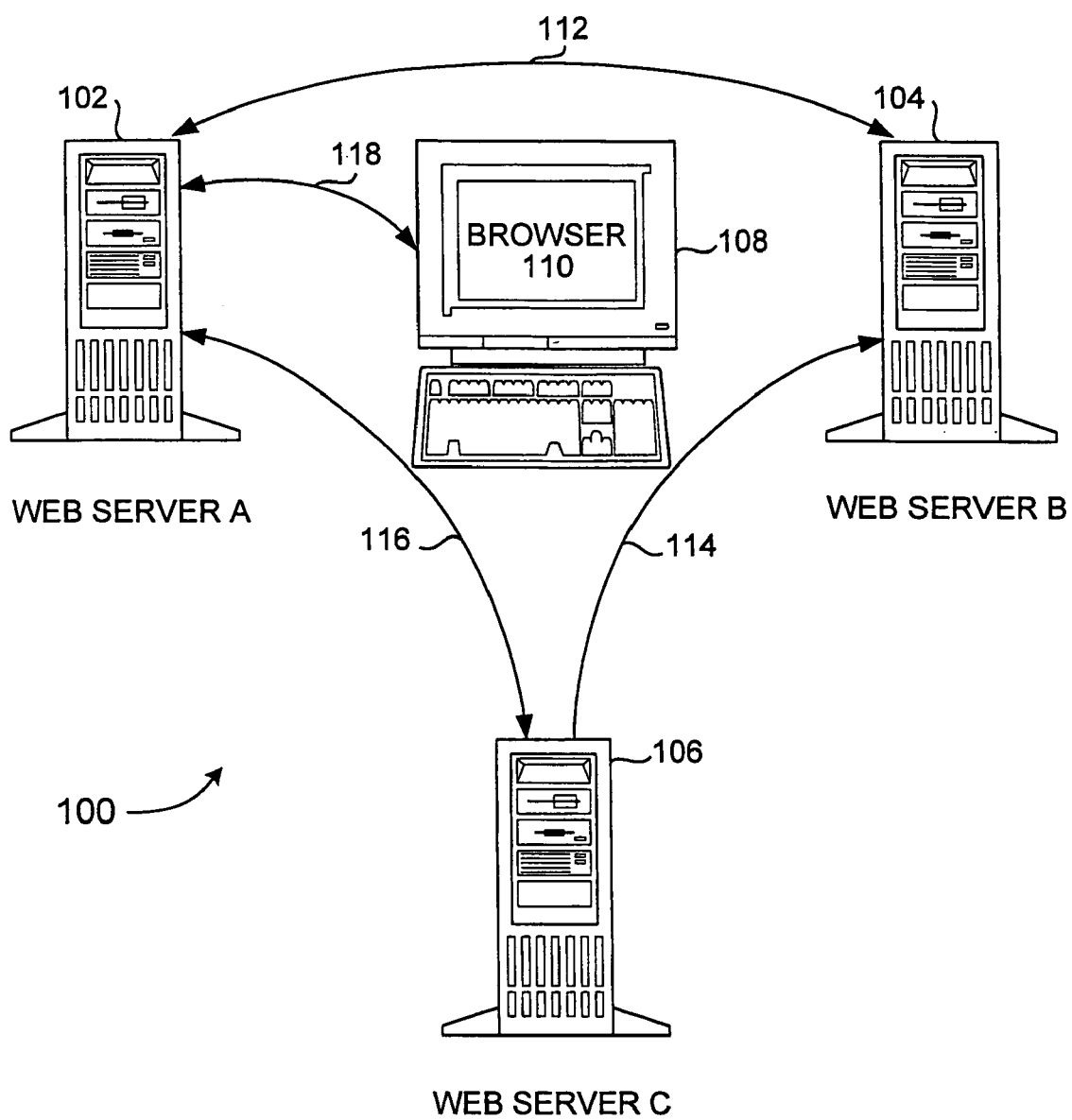
FIG. 1 is a diagram showing multiple connected servers containing Web sites and a browser in communication with one of the servers in accordance with one embodiment of the present invention.

To further illustrate the foregoing, FIG. 1 is a diagram showing multiple servers containing Web sites in one domain and a browser in communication with one of the servers in accordance with one embodiment of the present invention. A network 100 contains numerous components, among them a server A 102, a server B 104, a server C 106, and a client 108 running a browser 110. Each of the servers contains a particular service which a user, shown logically as browser 110, is interested in utilizing. Each of the servers are in the same domain (as described broadly above, and more specifically in the Internet context below) and can exchange information with each other as shown by lines 112, 114, and 116. According to the present invention, a user via browser 110 logs onto server A to gain access to services on a Web site as shown by line 118. While using the services, if browser 110 needs to gain access to servers B or C, it can do so without separately having to log onto server B 104 or server C 106. Server A 102 creates a session identifier for the session requested by browser 110 (i.e., a session identifier is created when the user on client 108 wants access to services on server A 102) and can later, if certain conditions are met, share its session data via lines 112 and 116 with server B 104 and server C 106 if browser 110 requests access to those services. Thus, browser 110 can gain access to servers B and C without having to separately or explicitly logon as a user via browser 110 did with server A 102 as shown by line 118. Beneficial to the user of browser 110, distinct connections are created between client 108 and server B 104 and server C 106 without having to stop activities on server A nad explicitly log onto them to use their services. As is described below, it is also possible for server A to share session information with server B and, subsequently, for server B to share the same session data with server C over line 114.

In the described embodiment, the servers are Web servers and the services are requested through user interfaces on Web sites on those servers. In other embodiments, servers and services described in FIG. 1 can depict other types of "sites," such as smart devices or appliances, intranet sites, components in home networks. Regardless of what type of site is utilized, they can communicate through some media, such as RF signals, infrared, copper wiring, or fiber optics, etc. represented by lines 112, 114, and 116. Similarly, client 108 and browser 110 can depict other types of media containing data on a particular user, such as a Java™ ring, credit card, smart card, Jini devices, and personal data assistants.

Figure 2A:
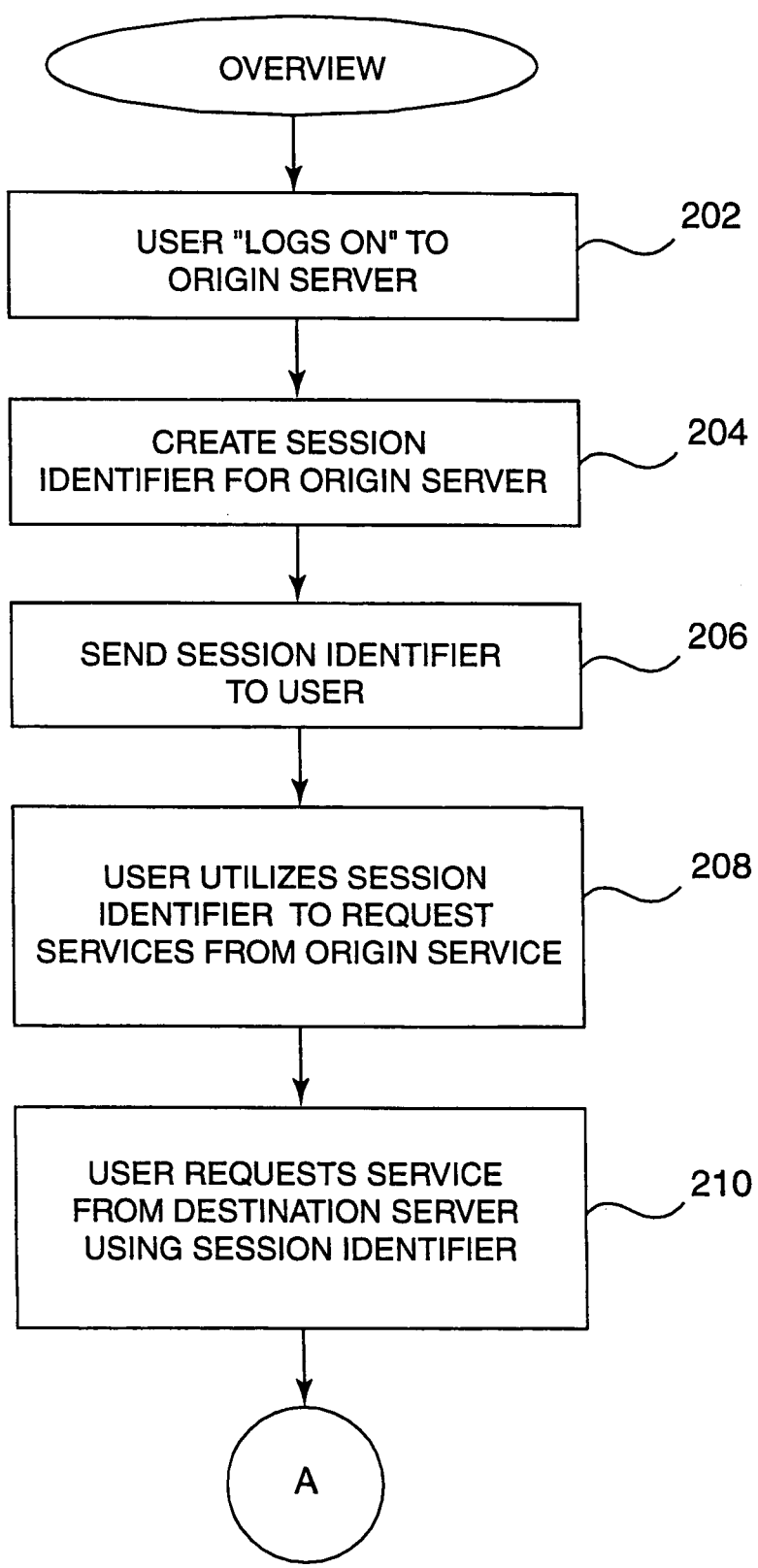
FIGS. 2A and 2B are flow diagrams of a process for sharing session information among sites in accordance with one embodiment of the present invention.
Figure 2B:
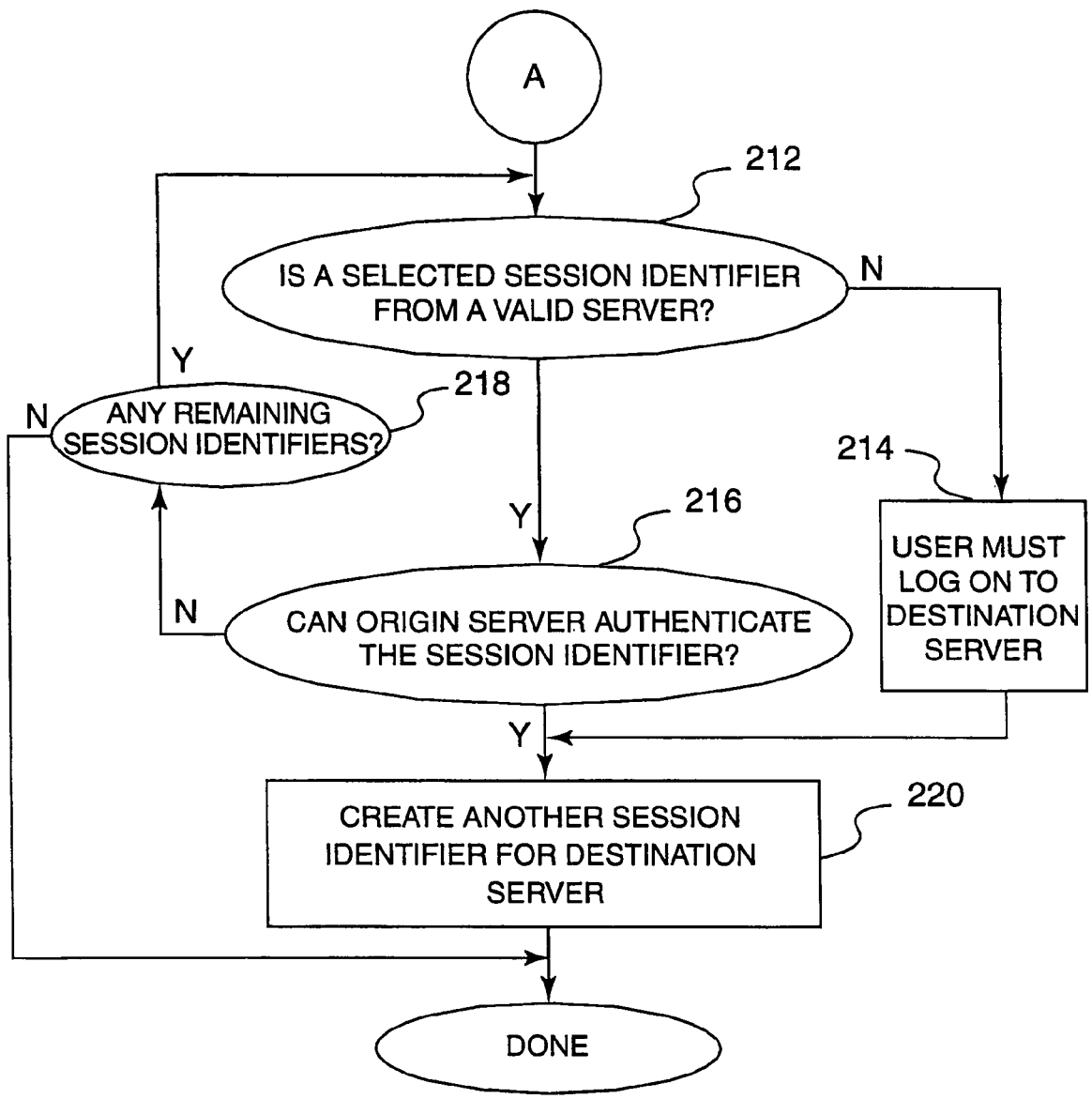

FIGS. 2A and 2B are flow diagrams of a process for sharing session information among sites in accordance with one embodiment of the present invention. It describes a process of a user authenticating itself with a site (i.e., logging onto a site) and having that authentication used to gain access to other sites in the same domain or system, depending on the type of site or entity involved. At step 202 a user explicitly logs onto a server referred to in the proceeding discussion as an origin server. As described above, the term "logging on" in the described embodiment means a user accessing a Web site. More generically, a user, which can be a human being, an automated process, or device, introduces and authenticates itself to a site. In other embodiments a site can be a device, a microprocessor, or scanner. By logging on, a user typically provides the origin server with a unique identifier that identifies only that user, such as login name and password. In some cases the identifier can be a social security number or a pin code. Such an identifier can also be read off a smart card or a Java™ ring. In any case, the identifier must uniquely identify the entity attempting to gain access to the origin server. As will be described below, other servers in the same domain can also be origin servers for a particular user.

At step 204 the information input by the user is used to create a session between the user and the origin server. A session is represented by a session identifier that originates and belongs to the origin server. In the described embodiment, the session identifier is a unique alphanumeric string that has a format recognizable to the Web browser. In other embodiments, the identifier has a format recognizable or appropriate to the device used by the user, e.g., a Java™ ring or smart card. The session identifier created is uniquely associated with the user and is deleted once the user has terminated a session with the origin server. One user can create more than one session identifier on the same server or on different servers in the domain.

At step 206 the origin server transmits the session identifier to the user which the user (i.e., Web browser) stores for subsequent requests for service on the origin server. This transmission is typically transparent to the user. In the described embodiment, the session identifier is handed back to the Web browser in the value field of a cookie normally transmitted from a Web server to the browser. As is generally practiced in the art, the Web site's unique identifier is in the name field of the cookie. An origin server can contain numerous Web sites, each having an identifier. For the purposes of this discussion, the origin server has one Web site, although the processes described here can apply to an origin server having multiple Web sites and <name, value> pairs. In another embodiment, URL rewriting can also be used for sharing session data among sites.

At step 208 the user begins requesting services on the origin server's Web site. In the described embodiment, when the user requests a service, it sends the origin server the same cookie it got from the origin server when it logged on. As the user begins making service requests from the origin server, the Web browser uses the session identifier with each request. The session identifier is embedded in the cookie sent by the user to the origin server when a request is made. This is also performed transparently to the user.

At step 210 the user branches out and requests services from another Web site on another server, referred to as a destination server, which can communicate with the origin server and is in the same domain, as defined in RFC 2109. Examples of Web sites in the same domain are those with the same top-level domain name such as sun.com or a more narrow domain of eng.sun.com. Domain names are specified in the domain field of a cookie. The user requests a service on the destination server without first explicitly logging onto the server or, more specifically, the "destination" Web site. In the described embodiment of the present invention, the session identifier created by the origin server is passed or handed to the destination server by the user when the user makes the request on the destination Web site. By examining the session identifier the destination server can determine that the user got the identifier from the origin server from the name and value fields of the cookie handed to the destination server. Those fields will contain the origin Web site's identifier and the session identifier, respectively. As defined in RFC 2109, only servers residing in the domain the specified in the cookie can receive the cookie. As mentioned above, the session identifier uniquely identifies the user and a session. In the described embodiment it contains an identifier containing an indicator of the origin server. By examining the fields in the cookie the destination server is informed that the session identifier very likely came from the origin server but, as is discussed below, the destination server still validates this information as a security precaution.

As mentioned earlier, it is possible that a user is logged onto more than one server. Thus, there may be a number of session identifiers and a number of different origin servers specified in one cookie (having multiple <name, value> pairs and domain values). As is well-known in the field of Internet programming, when using cookies for tracking sessions, each server creates it's own cookie. For example, a user may have logged onto servers A, B (in the same domain) and F (in a different domain) and can have three session identifiers. The user then desires to access services on server C, (in the same domain as servers A and B but not server F's). At step 212, server C, the destination server determines whether a session identifier from the user is from a valid server (i.e., one in the allowable domain).

For example, if (the destination server) first checks the identifier from server F, it will conclude that it is not a server with which it can share session data and thus not a valid server. The process by which the destination server (e.g., server C) determines which server owns the selected session identifier and a process by which the destination server examines configuration data to do this is described in FIG. 3. An example of configuration data is shown in FIG. 4. If the selected session identifier is from a valid server, control goes to step 214 where the user is required to log onto the server (i.e., server F) in order to access its services.

If the selected session identifier is determined to be valid; that is, it is from a server with which the destination server can share session identifiers, control goes to step 216. The session identifier is handed off to its origin server as determined in step 212. In the described embodiment, instructions on how to reach the origin server are contained in the destination server's verification routines as part of its configuration data. At step 216 the origin server determines whether it can authenticate the session identifier. This step is described in greater detail in FIG. 5. If the presumed origin server of the selected session identifier cannot authenticate or validate the session identifier, control returns to step 218 where it is determined whether the destination server has another session identifier to be validated. If so, control returns to step 212 and the process is repeated. If there are no remaining session identifiers the process is complete.

If the origin server can authenticate the session identifier at step 216, the destination server creates and owns a second session identifier the user at step 220. The user can now freely access services on the destination server without having to separately log onto the destination server as depicted in step 214. It is important to note that session "sharing" occurs between the origin and destination servers in a secure manner. That is, any data handed off to a destination server is carefully checked to ensure that bogus or harmful session data is not handed off or exchanged in order to bypass a logon procedure to gain access to services.

Returning to step 214, once the user is required to separately log onto the destination server or, more specifically the Web site outside the allowable domain, control goes to step 218 and a session identifier is created, similar to steps 202 to 208 for the origin server.

Figure 3:
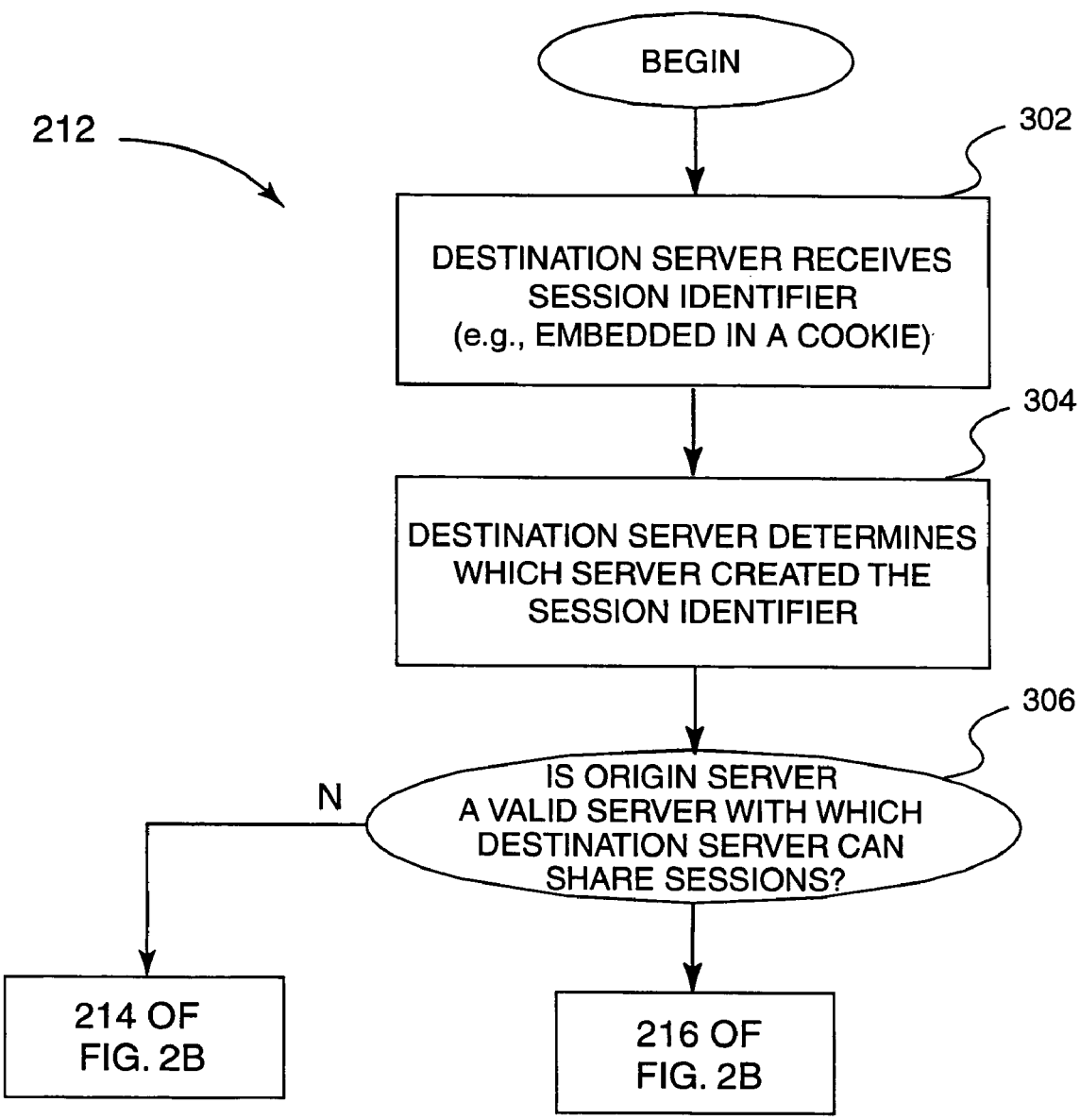
FIG. 3 is a flow diagram of a process of a destination server verifying and authenticating a session identifier in accordance with one embodiment of the present invention.
Figure 4:
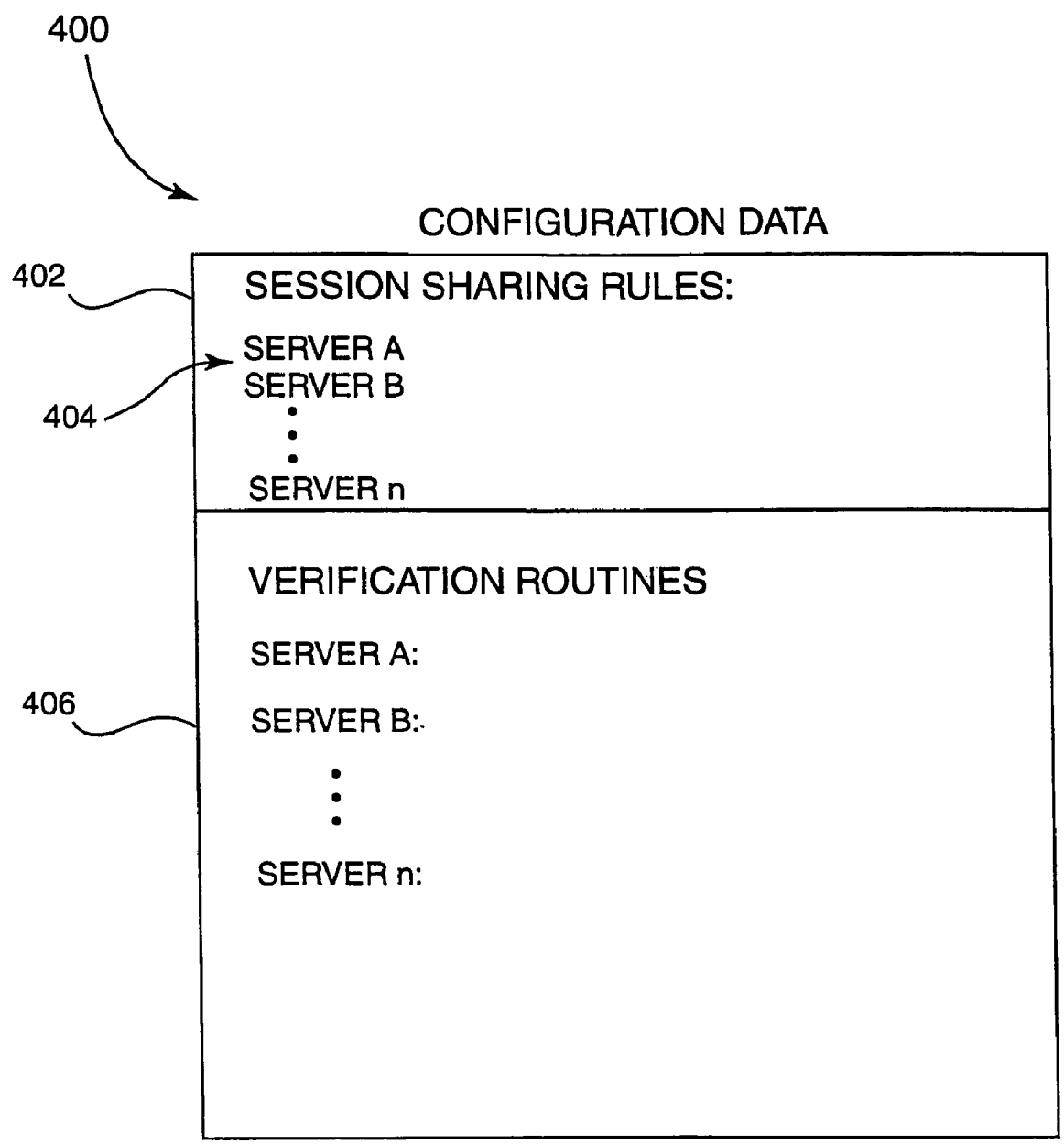
FIG. 4 depicts a structure for storing configuration data used by a server or other type of site needed to perform verification and authentication routines in accordance with one embodiment of the present invention.

FIG. 3 is a flow diagram of a process of a destination server validating a session identifier in accordance with one embodiment of the present invention. It shows in greater detail steps relating to step 212 of FIG. 2B. At step 302 the destination server receives a session identifier from the user when the user first requests a service. In the described embodiment, the session identifier is embedded in the value field of the cookie sent by the Web browser. In other embodiments, the session identifier can be passed through other means such as RF signals. At step 304 the destination server examines the cookie it received from the user when the user first requested a service and determines from the session identifier in the cookie that the identifier originated from a particular server. At step 304 the destination server is extracting information regarding where the session identifier was originally created. This is done by examining the name field in the cookie which may contain the name or identity of the origin server. In other embodiments, the cookie does not contain specific data indicating the owner of the session identifier. In this case the session identifier is unique across all servers in the domain.

At step 306 the destination server determines whether it can share a session with the server identified in step 304. In the described embodiment, the destination server does this by checking configuration data containing rules as to servers with which it can share session data. The rules segment of the configuration data lists servers or other entities that are in the domain within which session data can be shared. In other embodiments, additional criteria for defining a domain or group can be used. For example, only devices within hotel room can share session data, or only certain developer sites within an enterprise can share session data. If the destination server determines that it is able to share a session with the server identified in step 304, control continues with step 216 of FIG. 2B. In other embodiments, sites having other forms, such as devices can also store configuration data that can be used to check session identifiers transmitted from a user. Using the Java™ ring example, once an individual unlocks a door to a room, a session identifier is transmitted to the ring from the lock device on the door (the "origin" device). In the room, once the individual begins using another device, such as the television ("destination" device) the session identifier in the ring is transmitted to the television and the same verification process of FIG. 3 takes place.

Returning to step 306, if the destination server determines that it cannot share session data with the identified (or unidentified) server, the user must separately log onto the server as depicted in step 214 of FIG. 2B. As stated above, this typically occurs if the two servers are not configured to allow session sharing regardless of the domain. In another embodiment, session data can be shared across domains using URL rewriting instead of using a cookie.

FIG. 4 depicts a structure for storing configuration data used by a server or other type of site needed to perform verification and authentication routines in accordance with one embodiment of the present invention. In the described embodiment, a data structure 400 has a first segment 402 which stores rules for a Web server (referred to herein as the "base" server). Rules segment 402 contains data on sites with which the base server can share session data. In the described embodiment the data is a list of Web site names 404 or other unique identifiers of sites that are in the same domain as the base server or site. For example, they may all be sites in the sun.com domain or in the eng.sun.com domain. However, the base server may not necessarily share session identifiers with all sites in the same domain as the base server. Which sites can share sessions is typically an implementation decision and can be modified as needed.

A segment 406 contains verification routines for each of the sites with which the base server can share session data. In the described embodiment there is a verification routine for each site listed in segment 402. A verification routine contains instructions on how to go the site so that a session identifier can be authenticated. In the described embodiment, the instructions include a URL to a Web site or other instructions on reaching a server, and a method of passing the session identifier to the server for validation. In other embodiments these verification routines can take different forms. For example, instead of having a URL, the verification routine can contain a Java™ Remote Method Invocation or a CORBA. In other embodiments, rules segment 402 and verification routines segment 406 can be maintained as separate files at different locations. In yet other embodiments, each verification routine can be maintained as a separate module or object. In any case, the base server must have access to the rules and verification routines to perform the validation and authentication functions. The configuration data is stored and arranged in a manner best suited for the system and characteristics of the sites sharing the session data.

Figure 5:
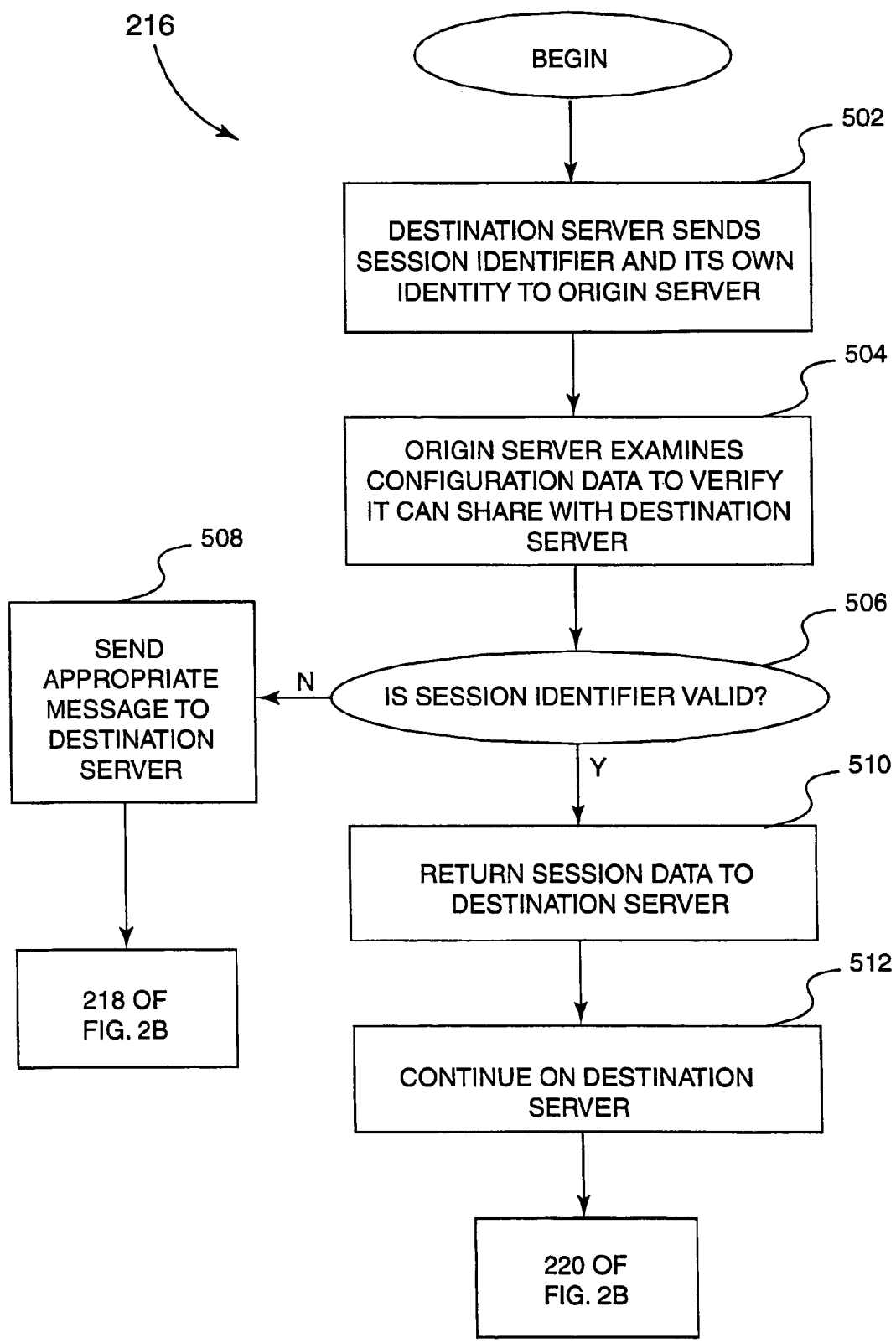
FIG. 5 is a flow diagram of a process of validating a session identifier sent from a destination server to an origin server in accordance with one embodiment of the present invention.

FIG. 5 is a flow diagram of a process of authenticating a session identifier sent from a destination server to an origin server in accordance with one embodiment of the present invention. It describes in greater detail step 216 of FIG. 2B in which the origin server determines whether it, in fact, created the session identifier passed to it by a destination server, thereby either authenticating or rejecting the identifier. At step 502 the destination server sends the session identifier and data on its own identity to the origin server. In the described embodiment, the self-identification data is a URL. In the described embodiment, this hand-off of session data is accomplished by embedding it in the value field of a cookie. The identity of the destination server is embedded in the name field. In another embodiment, a special link, possibly encoded in an HTML page can be used.

At step 504 the origin server examines its own configuration data, specifically rules segment 402, to authenticate that it can share sessions with the destination server. This procedure, and those described herein, are part of the general verification and authentication features of the session sharing methods of the present invention. With universal session sharing, security issues arising from unauthorized and possibly harmful servers or sites attempting to share session identifiers with entities in a closed domain should be addressed.

At step 506 the origin server determines whether the session identifier is valid. Since at step 504, it has been determined that the two servers can share session data, the validity of the session is determined by checking a list of active sessions identifiers. If it is not a valid session identifier, it informs the destination server by sending it an appropriate message at which stage the destination server goes to step 218 of FIG. 2B to check for other session identifiers. If the session identifier is valid, the origin server returns data related to that session to the destination server at step 510. In the described embodiment this data includes the origin server identifier. In other embodiments, the data includes data collected by the origin server related to the user activity on the server. In some contexts, such as in an enterprise network, the user activity data can be stored in a enterprise-wide shared database. The process then continues with step 220 of FIG. 2B where the destination server creates a session identifier for the user.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a system for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Figure 6:
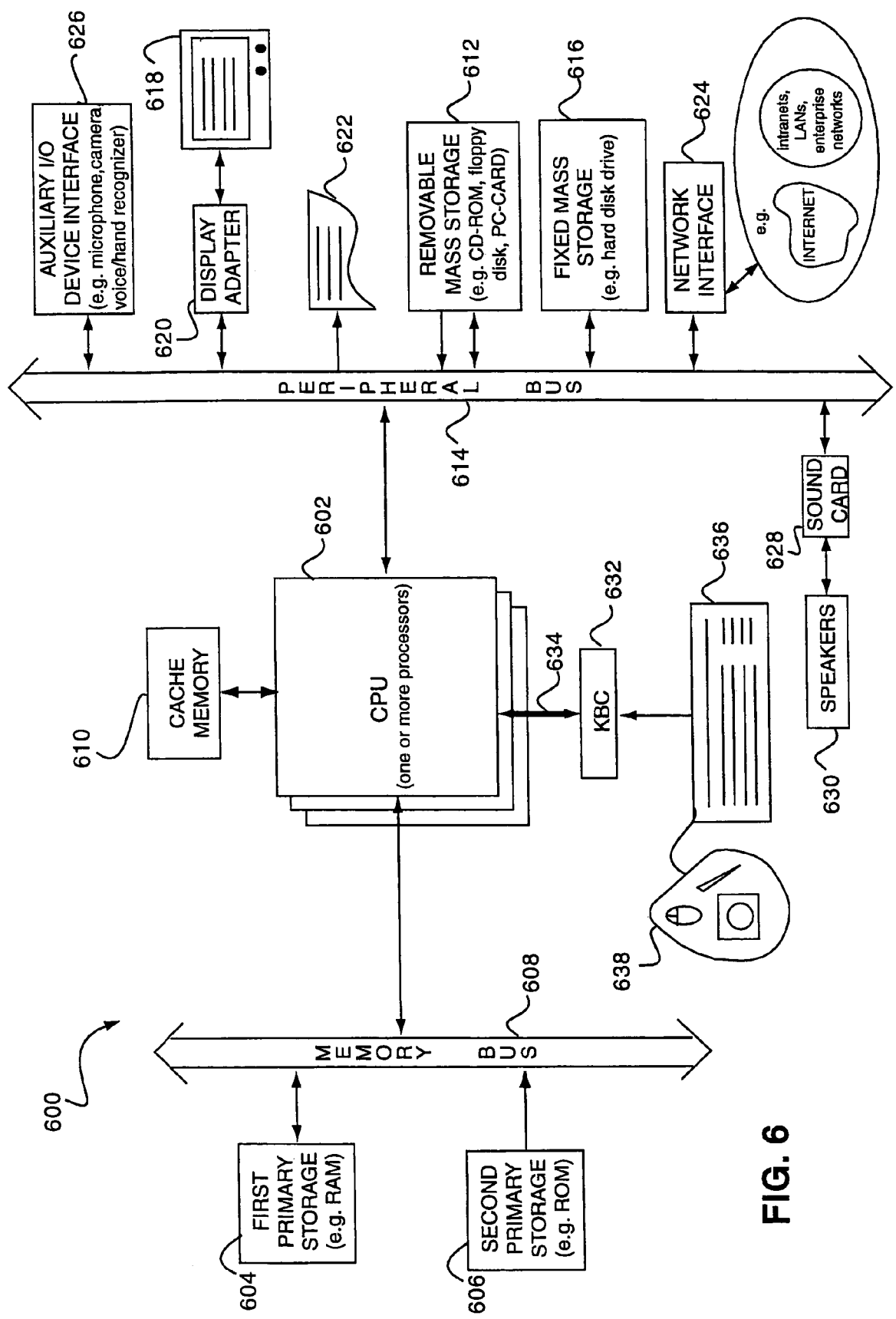
FIG. 6 is a block diagram of a typical computer system suitable for implementing an embodiment of the present invention.

FIG. 6 is a block diagram of a general purpose computer system 600 suitable for carrying out the processing in accordance with one embodiment of the present invention. FIG. 6 illustrates one embodiment of a general purpose computer system. Other computer system architectures and configurations can be used for carrying out the processing of the present invention. Computer system 600, made up of various subsystems described below, includes at least one microprocessor subsystem (also referred to as a central processing unit, or CPU) 602. That is, CPU 602 can be implemented by a single-chip processor or by multiple processors. It should be noted that in re-configurable computing systems, CPU 602 can be distributed amongst a group of programmable logic devices. In such a system, the programmable logic devices can be reconfigured as needed to control the operation of computer system 600. In this way, the manipulation of input data is distributed amongst the group of programmable logic devices. CPU 602 is a general purpose digital processor which controls the operation of the computer system 600. Using instructions retrieved from memory, the CPU 602 controls the reception and manipulation of input data, and the output and display of data on output devices.

CPU 602 is coupled bi-directionally with a first primary storage 604, typically a random access memory (RAM), and uni-directionally with a second primary storage area 606, typically a read-only memory (ROM), via a memory bus 608. As is well known in the art, primary storage 604 can be used as a general storage area and as scratch-pad memory, and can also be used to store input data and processed data. It can also store programming instructions and configuration data, such as session sharing rules and verification routines, in addition to other data and instructions for processes operating on CPU 602, and is used typically used for fast transfer of data and instructions in a bi-directional manner over the memory bus 608. As is well known in the art, primary storage 606 typically includes basic operating instructions, program code, data and objects used by the CPU 602 to perform its functions. Primary storage devices 604 and 606 may include any suitable computer-readable storage media, described below, depending on whether, for example, data access needs to be bi-directional or unidirectional. CPU 602 can also directly and very rapidly retrieve and store frequently needed data in a cache memory 610.

A removable mass storage device 612 provides additional data storage capacity for the computer system 600, and is coupled either bi-directionally or uni-directionally to CPU 602 via a peripheral bus 614. For example, a specific removable mass storage device commonly known as a CD-ROM typically passes data uni-directionally to the CPU 602, whereas a floppy disk can pass data bi-directionally to the CPU 602. Storage 612 may also include computer-readable media such as magnetic tape, flash memory, signals embodied on a carrier wave, PC-CARDS, portable mass storage devices, holographic storage devices, and other storage devices. A fixed mass storage 616 also provides additional data storage capacity and is coupled bi-directionally to CPU 602 via peripheral bus 614. The most common example of mass storage 616 is a hard disk drive. Generally, access to these media is slower than access to primary storages 604 and 606.

Mass storage 612 and 616 generally store additional programming instructions, data, and the like that typically are not in active use by the CPU 602. It will be appreciated that the information retained within mass storage 612 and 616 may be incorporated, if needed, in standard fashion as part of primary storage 604 (e.g. RAM) as virtual memory.

In addition to providing CPU 602 access to storage subsystems, the peripheral bus 614 is used to provide access other subsystems and devices as well. In the described embodiment, these include a display monitor 618 and adapter 620, a printer device 622, a network interface 624, an auxiliary input/output device interface 626, a sound card 628 and speakers 630, and other subsystems as needed.

The network interface 624 allows CPU 602 to be coupled to another computer, computer network, or telecommunications network using a network connection as shown. Through the network interface 624, it is contemplated that the CPU 602 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 602 can be used to connect the computer system 600 to an external network and transfer data according to standard protocols. That is, method embodiments of the present invention may execute solely upon CPU 602, or may be performed across a network such as the Internet, intranet networks, or local area networks, in conjunction with a remote CPU that shares a portion of the processing. Additional mass storage devices (not shown) may also be connected to CPU 602 through network interface 624.

Auxiliary I/O device interface 626 represents general and customized interfaces that allow the CPU 602 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 602 is a keyboard controller 632 via a local bus 634 for receiving input from a keyboard 636 or a pointer device 638, and sending decoded symbols from the keyboard 636 or pointer device 638 to the CPU 602. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 608, peripheral bus 614, and local bus 634 are illustrative of any interconnection scheme serving to link the subsystems. For example, a local bus could be used to connect the CPU to fixed mass storage 616 and display adapter 620. The computer system shown in FIG. 6 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, while the invention is described in the context of Web sites and the Internet, it can also be used in other contexts where there is a distinguishable session or similar activity, and user and sites that can communicate. In another example, session data and site identities can be embedded in appropriate data structures or packets, as opposed to a cookie, and transmitted through various media. Furthermore, such data and identities do not have to be in an alphanumeric format. The configuration data can be stored in various types of memory devices, such as a cache memory or a CD-ROM, depending on the context in which the invention is being used. Accordingly, the present embodiments are to be considered as illustrative and not restrictive, and the invention is not to be limited to the details given herein, but may be modified within the scope and equivalents of the appended claims.

What is claimed is:

1. A method of sharing data related to a session created by a user within a domain of services, the method comprising:
   creating a first session identifier associated with a user initially accessing a first service by identifying the user;
   passing the first session identifier to a second service when the user desires initial access to the second service;
   by the second service, determining whether the first session identifier is from a valid service with which the second service can share sessions;
   when it is determined that the first session identifier is from a valid server service with which the second service can share sessions, providing the first session identifier, received from the first service, back to the first service, along with an identifier of the second service to enable the first service to validate that the first session identifier, provided back from the second service, identifies a session associated with the first service and to validate that the service having the identifier of the second service, provided from the second service, is a service with which the first service can share sessions; and
   creating a second session identifier associated with the user upon validation, by the first service, of the first session identifier and the identifier of the second service, thereby allowing the user to use the second service without requiring separate identification of the user to the second service,
   wherein determining that the first session identifier is from a valid service with which the second service can share sessions includes:
       examining session sharing rules associated with the second service;
       determining whether the second service can communicate session data with the first service; and
       examining a verification routine associated with the first service.

2. A method as recited in claim 1 wherein a user initially accesses a first service by logging on to a first site containing the first service thereby receiving user data.

3. A method as recited in claim 2 wherein a first session identifier includes a portion of the user data and data associated with the first service and a second session identifier includes the portion of the user data and data associated with the second service.

4. A method as recited in claim 1 wherein the first session identifier and the second session identifier have a format recognizable to the first service and the second service.

5. A method as recited in claim 2 wherein the fist site is a Web site.

6. A method as recited in claim 1 further comprising utilizing the first session identifier when using the first service.

7. A method as recited in claim 1 wherein passing the first session identifier to a second service further includes embedding the first session identifier in a cookie.

8. A method as recited in claim 7 wherein the first session identifier is stored in a value field of the cookie.

9. A method as recited in claim 1 wherein passing the first session identifier to a second service further includes transmitting the first session identifier through radio frequency signals.

10. A method as recited in claim 1, wherein determining that the service identified in the first session identifier is from a valid service with which the second service can share sessions includes processing the first session identifier against a configuration database.

11. A method as recited in claim 1 wherein determining that the first session identifier is from a valid service with which the second service can share sessions includes determining that the service identified in the first session identifier is a service from within a predetermined domain of services.

12. A method as recited in claim 1 wherein validating the first session identifier further includes examining the first session identifier on the first service.

13. A method as recited in claim 1 wherein the session sharing rules and the verification routine are examined by the second service.

14. The method as in claim 1, wherein the first session identifier is provided in a value field of a cookie.

* * * * *